(12) United States Patent
Burrell et al.

(10) Patent No.: US 8,829,364 B2
(45) Date of Patent: Sep. 9, 2014

(54) BELT WEIGHING SYSTEM HAVING AN ENTRY TRANSITION SUPPORT STRUCTURE

(75) Inventors: Leonard Ian Burrell, Peakhurst (AU); Lorne Harold Danielson, Langley (CA)

(73) Assignees: Leonard Ian Burrell, Peakhurst, NSW (AU); Lorne Harold Danielson, British Columbia (CA)

( * ) Notice: Subject to any disclaimer, the term of this patent is extended or adjusted under 35 U.S.C. 154(b) by 450 days.

(21) Appl. No.: 13/146,890

(22) PCT Filed: Feb. 2, 2010

(86) PCT No.: PCT/AU2010/000098
§ 371 (c)(1),
(2), (4) Date: Sep. 15, 2011

(87) PCT Pub. No.: WO2010/085858
PCT Pub. Date: Aug. 5, 2010

(65) Prior Publication Data
US 2011/0315457 A1 Dec. 29, 2011

(30) Foreign Application Priority Data
Feb. 2, 2009 (AU) ................................ 2009900380

(51) Int. Cl.
*G01G 11/00* (2006.01)
*B65G 15/30* (2006.01)
*B65G 39/12* (2006.01)

(52) U.S. Cl.
USPC ............................................. 177/16; 177/119

(58) Field of Classification Search
USPC .......................................... 177/16, 119, 145
See application file for complete search history.

(56) References Cited

U.S. PATENT DOCUMENTS

| 3,299,975 | A |   | 1/1967  | Stambera et al. |
| 4,557,341 | A | * | 12/1985 | Söderholm ..................... 177/16 |
| 5,057,383 | A | * | 10/1991 | Sokira ............................. 429/92 |
| 5,686,653 | A | * | 11/1997 | Homer et al. .................. 73/1.13 |
| 5,689,092 | A | * | 11/1997 | Wurz et al. ..................... 177/145 |
| 5,853,849 | A | * | 12/1998 | Nishio et al. .................. 428/143 |
| 7,004,311 | B2 |   | 2/2006  | Fatato et al. |
| 8,188,384 | B2 | * | 5/2012  | Verhaar ......................... 177/119 |

FOREIGN PATENT DOCUMENTS

| CN | 201075025 Y | 6/2008 |
| CN | 201075026 Y | 6/2008 |
| GB | 1 566 952   | 5/1980 |

* cited by examiner

*Primary Examiner* — Randy W Gibson
(74) *Attorney, Agent, or Firm* — The Webb Law Firm (57) ABSTRACT

A belt weighing system comprising a weigh frame, an entry transition support structure and an exit transition support structure positioned on either sides of the weigh frame. The weigh frame preferably includes a plurality of closely spaced idlers to support a conveyor belt. The optional entry transition support structure can include one or more second belt support components, and the optional exit transition support structure can include one or more third belt support components. In one example form, a plurality of closely spaced idlers is also provided to support the belt adjacent or near the weigh frame in the transition regions. The plurality of closely spaced idlers reduces, ameliorates or controls belt sag at or near the weigh frame and thus reduces errors that are otherwise introduced by relative material movement or other non-linear dynamic effects along the conveyor belt.

16 Claims, 7 Drawing Sheets

FIGURE 1

(prior art)

FIGURE 2

(prior art)

BELT WEIGHING SYSTEM HAVING AN ENTRY TRANSITION SUPPORT STRUCTURE

TECHNICAL FIELD

The present invention generally relates to the field of conveyor belt weighing systems, in which a reliable live load performance is sought for high accuracy weighing of material being conveyed on a belt when the system is calibrated with static mass.

BACKGROUND

There have been many approaches in attempting to develop a reliable conveyor belt weighing system. Accurate motion weighing equipment is required for bulk handling of materials in many diverse industries, for example mining, ship loading, rail loading, grain, coal power, wool scouring, quarry, food industries, etc. Presently, however, no known belt weighing designs provide a sufficiently reliable live load performance on the basis of a static mass calibration. In the field of high accuracy belt weighing, particularly in the case of longer conveyer belt systems, there are two prevalent designs of belt weighing systems. These are: pivoted weigh frames (sometimes called "approach-retreat" systems); and, fully suspended or floating weigh frames.

Accurate weighing of materials whilst being transported on a conveyor belt poses some inherent problems. For example, a weighing scale suspension system must function to transmit forces on weighing system idlers (i.e. rollers) by transmitting only the force normal to the line of the conveyor belt without resolving any lateral forces or belt tension induced forces into the weigh frame output signal.

A particular problem that has been identified by the Applicants concerns the dynamic effects which occur as the material in transit on the conveyor rises and falls over each supporting idler set, these dynamic effects are caused either from relative movement of conveyed material along the conveyor belt or non-linear dynamic effects as the material rises and falls. Previously, the relative movement source of error has not been realised or has been deemed insignificant. The relative movement results in the actual particles of the bulk material not travelling along the conveyor belt at the speed of the conveyor belt itself. This relative movement error is often small, however, the relative movement error represents an error which has not previously been properly understood or appreciated, and which can cause belt weighing scales designed to achieve 0.25% accuracy in reality achieve only perhaps 0.5% or 1.0% percent accuracy.

One solution to this problem would be to measure the actual speed of the particles of the bulk material themselves by some means, and not to assume that the speed of the belt represents the speed of the conveyed material. However, this would necessitate development of new measurement systems.

The other source of error, thought to arise from non-linear dynamic effects, is not well understood. There are error effects which occur when material is weighed in motion, whether they are due to the non-linear dynamic effects or whether they are due to the material movement relative to the belt effect.

Another significant source of belt weighing error, that is known in the art, arises from the interactions between a weigh frame and a tensioned conveyor belt, via which the conveyed material must be weighed. It can be demonstrated that the precision of measurement of the weight per unit length of the conveyed material over the weigh frame is influenced by belt tension and idler (i.e. roller) misalignment. Ideally, if a conveyor belt was perfectly aligned and included a completely suspended weigh frame of ultimate rigidity, such that it was perfectly aligned at all times, then belt tension, a force in the belt which is perpendicular to the weight which is to be measured, would not have any influence on the weight measurement. However, ideal conditions do not normally exist and belt tension is a significant source of error in measurement of weight.

Figure 1:
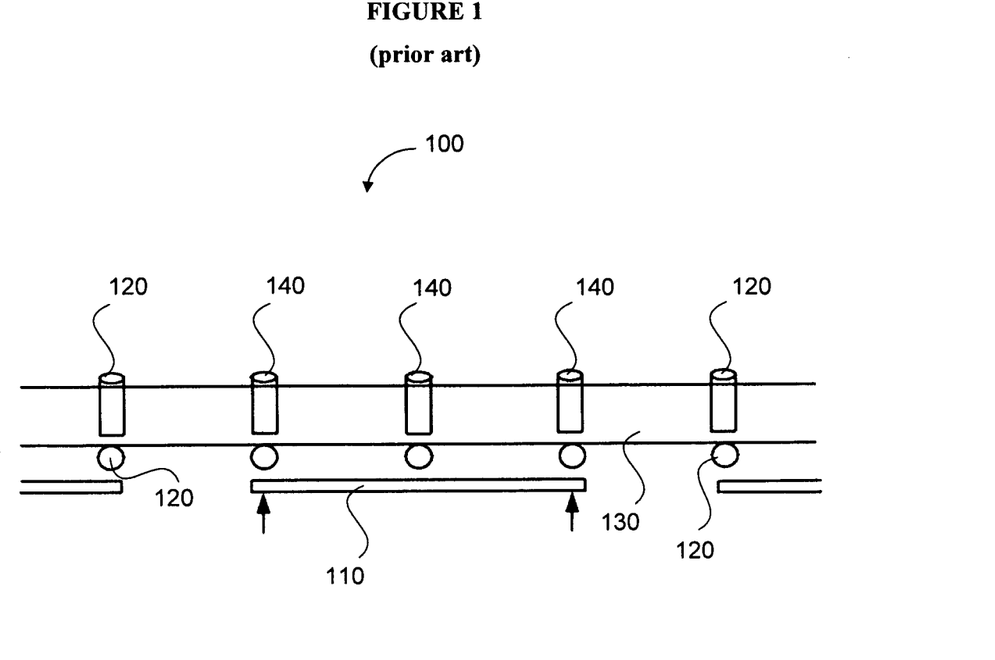
FIG. 1 (prior art) illustrates a conventional fully suspended weigh frame having normal or standard idler spacing.

Referring to FIG. 1, there is illustrated a known conventional fully suspended weigh frame 110 forming part of a belt weighing system 100. Belt weighing system 100 includes idlers 120 spaced apart to support belt 130. Idlers 140 are part of fully suspended weigh frame 110. Conveyed material being transported along belt 130 imparts its weight via belt 130 and idlers 140 and can be measured by weigh frame 110. A fully suspended weigh frame has the property that if an idler mounted on the weigh frame were to jamb, then the resulting frictional force in line with the belt would have practically no effect on the output weight signal. Also, the normal idler rolling friction, nominally 2 to 3% of the load on the conveyor belt, is not reflected in the output weight signal from the weigh frame. In a fully suspended weigh frame, weight applied at any location on the weigh frame will produce the same output weight signal. Such designs are only sensitive to loads perpendicular to the conveyor belt.

Figure 2:
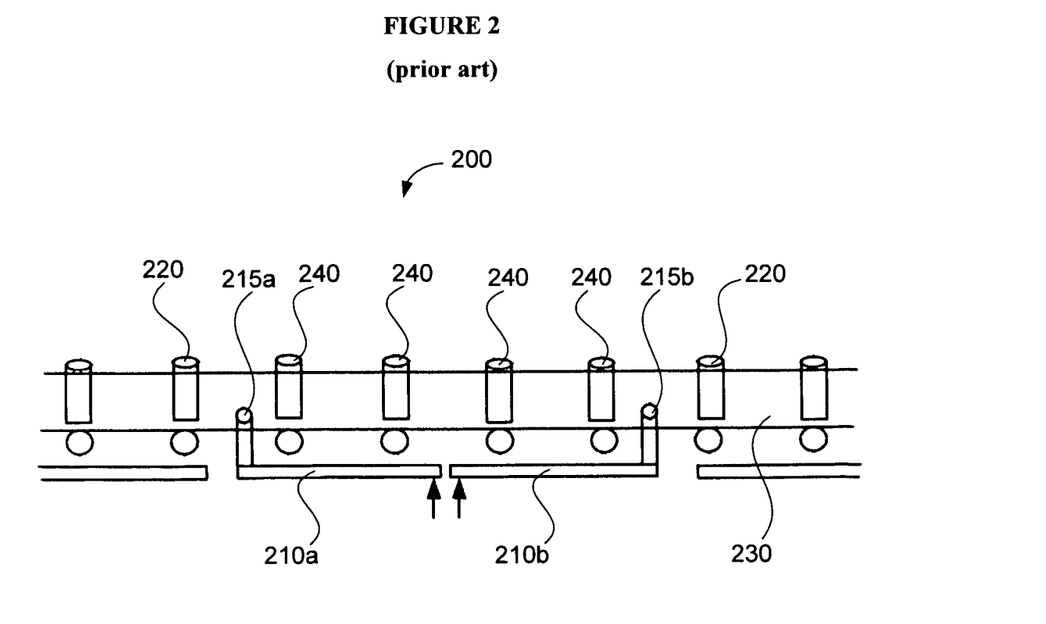
FIG. 2 (prior art) illustrates a conventional pivoted (i.e. "approach-retreat") type weigh frame having normal or standard idler spacing.

Referring to FIG. 2, there is illustrated a known conventional dual pivoted "approach-retreat" type weigh frame forming part of a belt weighing system 200. Weigh frames 210a, 210b are pivoted at pivot points 215a and 215b, respectively. Idlers 220 support conveyor belt 230 and idlers 240 form part of the weigh frame. In pivoted weigh frame designs there is a component of idler friction in the output weight signal due to a turning moment about the pivot points. Weight applied to the weigh frame produces a variable output weight signal depending on the distance from a pivot point.

There is a need for a belt weighing system which addresses or at least ameliorates one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

BRIEF SUMMARY OF INVENTION

The Applicants identified that conveyor belt sag contributes to relative material movement along the conveyor belt or other non-linear dynamic effect. It has also been identified by the Applicants that the greater the belt sag, the greater the relative movement of material on the belt or other non-linear dynamic effect. The Applicants have devised a belt weighing system to eliminate or reduce belt sag, or otherwise control belt sag to an acceptably low level, that controls or ameliorates relative movement of material conveyed along the conveyor belt or other non-linear dynamic effect.

The Applicants discovered the surprising result that placing idlers at a closer spacing than previously thought necessary to achieve industry belt sag design standards reduces belt sag to relatively small levels and thus reduces the previously unknown or unappreciated errors that are introduced by relative material movement along the conveyor belt or other non-linear dynamic effect.

According to an example form, there is provided a belt weighing system, comprising a weigh frame provided with a plurality of closely spaced belt support components to support a conveyor belt at the weigh frame. Preferably, the belt support components are idlers.

In further particular, but non-limiting, forms: the plurality of closely spaced belt support components reduce the conveyor belt sag to less than 2% of the spacing between the belt support components; the belt support components are positioned apart at less than 1.0 m spacing; the belt support components are positioned apart at less than 0.75 m spacing; and/or the belt support components are positioned apart at less than 0.5 m spacing.

Optionally, the belt includes a surface structure or composition to reduce material slip on the belt. Preferably, the weigh frame is a fully suspended weigh frame.

According to another example form, there is provided a belt weighing system comprising: a weigh frame including at least one belt support component to support a conveyor belt; a plurality of closely spaced belt support components in an entry transition region positioned on a first side of the weigh frame; and, a plurality of closely spaced belt support components in an exit transition region positioned on a second side of the weigh frame.

In a particular example, an entry transition support structure is provided in the entry transition region, an exit transition support structure is provided in the exit transition region, and the entry transition support structure and the exit transition support structure are independent structures to the weigh frame.

Preferably, the plurality of closely spaced belt support components are a plurality of closely spaced idlers. In various forms, the at least one belt support component of the weigh frame is a plurality of closely spaced idlers, or the at least one belt support component of the weigh frame is a slider bed. A variety of slider beds could be used, for example a fixed base type or an air supported type. Preferably, the plurality of closely spaced belt support components reduce the conveyor belt sag to less than 2% of the spacing between the belt support components.

In further particular, but non-limiting, forms: the entry transition support structure and the exit transition support structure include closely spaced idler racks; the closely spaced idler racks are pivoted, having at least one pivot point; the entry transition support structure and/or the exit transition support structure include one or more winged support components; the one or more winged support components are angled idlers; and/or the one or more winged support components are part of a parallelogram structure.

According to another example form, there is provided a belt weighing system comprising: a weigh frame including a plurality of closely spaced idlers to support a belt; a plurality of closely spaced idlers to support the belt in at least one transition region that is adjacent to the weigh frame; and, a plurality of idlers that are not closely spaced to support the belt outside of the at least one transition region. Preferably, the plurality of closely spaced idlers reduces belt sag in the at least one transition region as compared to belt sag resulting from the plurality of idlers that are not closely spaced to support the belt outside of the at least one transition region.

BRIEF DESCRIPTION OF FIGURES

Example embodiments should become apparent from the following description, which is given by way of example only, of at least one preferred but non-limiting embodiment, described in connection with the accompanying figures.

PREFERRED EMBODIMENTS

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

The Applicants have identified that belt sag causes relative up and down movement at right angles to the belt, so that particulates in the conveyed material tends to be shaken up and down as the material passes over the idlers. This material disturbance influences the material's own flow characteristics and an inclination of the belt can aggravate relative movement of the material along the belt or other non-linear dynamic effect in which the mass of the material experienced by the weigh frame does not represent the true weight due to up and down accelerations and forces which are unequal or non-linear.

Relative movement of material along the conveyor belt, a phenomenon identified by the Applicants that might be referred to as "material slip" or other potential non-linear dynamic effects, are not the only significant source of belt weighing error which needs to be controlled or ameliorated to achieve reliable weighing of material to a predictable and highly accurate level. Belt tension introduces another source of weighing error.

It is known that one means of controlling belt tension on a weigh frame is to increase the idler spacing around or near the weigh frame. This means increasing the transition distance between the last fixed idler (or idler set, being a set of idlers) on the conveyor belt line and the first idler (or idler set) on the weigh frame; and also increasing the transition distance between the last idler (or idler set) on the weigh frame and the next fixed idler (or idler set) on the conveyor belt line following the weigh frame. When the transition distances at the ends of the weigh frame are extended, any misalignment between the weigh frame and the adjoining idlers of the conveyor belt line results in a smaller angular misalignment, and hence less belt tension effect is resolved perpendicularly to the belt and thus into the weight measurement.

The Applicants have thus identified two apparently conflicting requirements for accurate belt weighing systems, being:

1. to reduce idler spacing to eliminate relative material movement or other non-linear dynamic effect on the belt due to belt sag (identified by the Applicants);
2. to increase idler spacing, especially at the ends of the weigh frame, to reduce the influence of belt tension on the weight measurement (the accepted industry practice).

The Applicant's believe it is thus desirable to construct a belt weighing system which has closely spaced idlers as part of a weigh frame; and/or a transition structure or region onto the weigh frame which meets the need of not disturbing the material on the belt, and which also meets the need of reducing angular misalignment of the belt in this transition space. Based on this unexpected and conflicting set of requirements, the Applicants have devised belt weighing systems to address these apparently conflicting requirements.

Figure 3A:
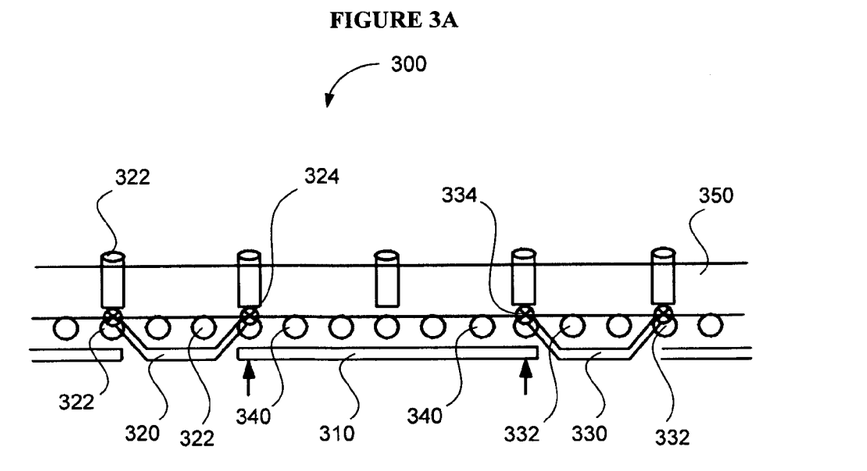
FIG. 3A illustrates a belt weighing system having a central fully suspended weigh frame including a plurality of closely spaced idlers positioned between an entry transition structure and an exit transition structure.

Referring to FIG. 3A, there is illustrated a belt weighing system 300 that comprises a fully suspended weigh frame 310 including a plurality of closely spaced first belt support components 340. The plurality of closely spaced first belt support components 340 support belt 350 in relation to the fully suspended weigh frame 310. Optionally, an entry transition support structure 320 is positioned on a first side of the fully suspended weigh frame 310 and includes one or more second belt support components 322. Also optionally, an exit transition support structure 330 is positioned on a second side of the fully suspended weigh frame 310 and includes one or more third belt support components 332.

The entry transition support structure 320 and the exit transition support structure 330 are independent structures from the fully suspended weigh frame 310. In the example illustrated, the plurality of closely spaced first belt support components 340, the one or more second belt support components 322, and/or the one or more third belt support components 332 are idlers. In a particular example embodiment, the one or more second belt support components 322 and/or the one or more third belt support components 332 are a plurality of closely spaced idlers.

The closely spaced idlers can be provided as a closely spaced idler (i.e. roller) rack, which is a framework including a plurality of idlers. A closely spaced idler rack can be pivoted at one or more points, for example at pivot points 324 or 334.

In another embodiment, the entry transition support structure 320 and/or the exit transition support structure 330 can include one or more winged support components, for example which may be angled idlers placed at an angle to a base idler.

In another embodiment, the one or more second belt support components, and/or the one or more third belt support components can be slider beds instead of idlers. If slider beds are used the slider beds are preferably pivoted.

Figure 3B:
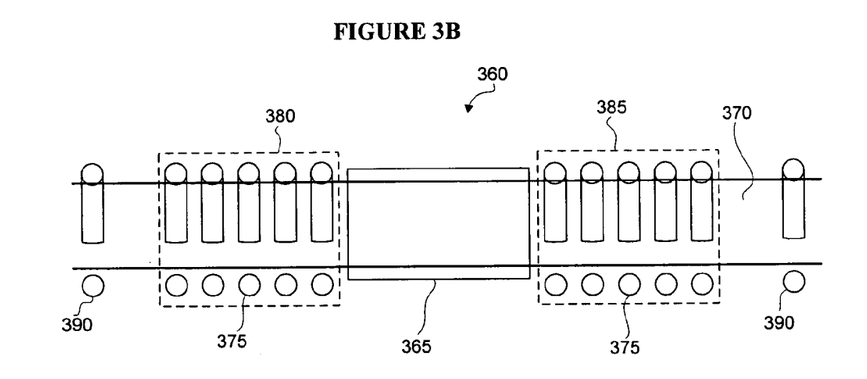
FIG. 3B illustrates a belt weighing system having a weigh frame positioned between an entry transition region and an exit transition region each having a plurality of closely spaced idlers.

Referring to FIG. 3B, in yet another embodiment, there is provided a belt weighing system 360, comprising any type of weigh frame 365 that includes at least one belt support component to support a belt 370. The at least one belt support component included as part of the weigh frame could be a plurality of closely spaced idlers or one or more slider beds. The belt weighing system 360 also includes a plurality of closely spaced belt support components 375 (e.g. idlers or idler sets) to support the belt 370 adjacent or near the weigh frame 365 in entry transition region 380 and exit transition region 385. The plurality of closely spaced idlers 375 are used to reduce, control or ameliorate belt sag to reduce relative movement of material on the belt or other non-linear dynamic effects. Beyond the transition regions 380, 385 standard spaced idlers 390 can be used.

Thus, a plurality of closely spaced idlers are used to support the belt in at least one transition region that is adjacent or near the weigh frame. A further plurality of idlers are used that are not closely spaced (i.e. normal or standard industry spacing) to support the belt outside of the at least one transition region. The plurality of closely spaced idlers reduces belt sag in the at least one transition region as compared to belt sag resulting from the further plurality of idlers that are not closely spaced to support the belt outside of the at least one transition region. The relative spacing of idlers 375, 390 shown in FIG. 3B is arbitrary and for illustrative purposes only. The belt weighing system can include more than one weigh frame positioned adjacent each other between the entry transition and exit transition regions.

Figure 3C:
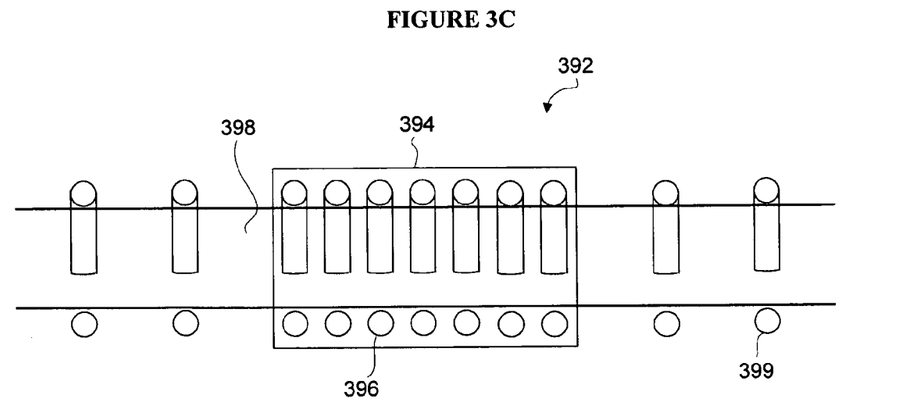
FIG. 3C illustrates a belt weighing system having a weigh frame including a plurality of closely spaced idlers.

Referring to FIG. 3C, in yet another embodiment, there is provided a belt weighing system 392 that comprises a fully suspended weigh frame 394 including a plurality of closely spaced belt support components. Preferably, a plurality of closely spaced idlers 396 are used. The plurality of closely spaced idlers 396 support belt 398 in relation to the fully suspended weigh frame 394. The plurality of closely spaced idlers 396 are used to reduce, control or ameliorate belt sag at the weigh frame to reduce relative movement of material on the belt or other non-linear dynamic effects. Beyond the weigh frame, idlers 399 can be used that are not closely spaced (i.e. normal or standard industry spacing) to support the belt.

In various embodiments, any form of on and off ramp or transition region structure to a belt weigh frame can be utilised that achieves the results of both reducing angular misalignment of the belt and also that of not disturbing, by shaking or otherwise upsetting the material in motion on the conveyor belt, preferably with the ramp or transition structure including special belt support in the form of closely spaced idlers or alternatively a slider bed.

Currently, the industry accepted belt sag is approximately 2% of the idler spacing. Industry accepted standards use a variety of design spacings depending upon belt loading and belt tension as required to achieve acceptable belt sag of approximately 2%. The spacing of idlers is generally for economical reasons, and often 1.5 m spacing is used to reduce the number of idlers required for conveyors carrying relatively light materials such as coal; and 1.0 m spacing is also often used for conveyors carrying heavy materials such as minerals. Placing normal carry idlers at or near a weigh frame or transition region to a weigh frame at a spacing of less than 1.0 m has not been contemplated in relatively long conveyor belt systems due to the additional expense, and because to-date there has been no perceived benefit.

The Applicants have provided a belt weighing system with significantly improved accuracy by associating a weigh frame and/or transition region with relatively closely spaced idlers (i.e. closely spaced idler or roller racks). Closely spaced idlers can be optionally positioned at each end of the weigh frame in transition regions, but are preferably positioned along the length of the weigh frame. In other words, closely spaced idlers could be positioned along the whole weigh zone (weigh frame and transition regions onto and off the weigh frame). The close spacing of idlers may be continued on the weigh frame and in the sections before and after the transition ramps. Away from the weigh frame and beyond entry and exit transition regions or sections, industry accepted and standard idler spacing could be used as no weight measurements occur in these sections of the conveyor belt.

In a particular embodiment, closely spaced idler racks are used which are pivoted at each end and consist of horizontal carry idlers which are pivoted at or near the line of belt contact with the top of the idlers. This has the effect that friction which might be derived from the idlers on the pivoted transition ramps are not experienced by the weigh frame and are thus not part of the output weight signal. Thus, a belt weighing system is provided that has idlers or idler sets that are spaced sufficiently closely near or in a transition area of a weigh frame so as to control or ameliorate belt sag.

Another advantage can be realised by using closely spaced idlers. Different materials are known to show different degrees of error on the same belt weigher due to differing material flow characteristic. Closely spaced idlers bypass this problem because relative movement of the material and non-linear dynamic effects are reduced or avoided so that the material remains in situ. Closely spaced idlers additionally address another problem of different belt speeds showing different weight results.

The entry transition support structure and the exit transition support structure can be pivoted at the line of contact of the belt with the last/first fixed idler before/after the weigh frame, and on the end toward the weigh frame can be pivoted at the line of contact between the belt and the first and last idler on the weigh frame. Such a pivoting arrangement avoids the influence of belt tension.

Accepted standards in the art of belt weighing systems use conveyors that often have 1.5 m spacing of idlers or idler sets along the normal carry side of the conveyor. Sometimes, extended spacing up to 2.0 m or as much as 5.0 m may be used to minimise belt tension effects. Also, in some instances, where belt tension is not considered as a significant issue, 1.0 m spacing of idlers or idler sets is used as an accepted standard.

In the present specification, "closely" spaced idlers or idler sets are considered to be idler spacings no greater than 1.0 m. As a non-limiting example, any idler spacing less than or equal to half the normal spacing used in a particular implementation could be considered "closely" spaced. More generally, however, the term "closely" is to be read as referring to spacing of idlers or idler sets so that belt sag effects are significantly reduced at or in the vicinity of a weigh frame. As an example measure, closely spaced idlers achieve a belt sag of less than 2% of idler spacing. As specific examples, the idlers can be set at less than 1.0 m spacing, less than or equal to 0.75 m spacing or less than or equal to 0.5 m spacing, or could be spaced immediately adjacent to each other packed as tightly as possible, or in the limiting example the rolls could be replaced by a slider bed.

In a further embodiment, it is possible to arrange winged or troughed idlers on the entry and exit transition structures which do not contribute any idler friction component to the output weight signal by using appropriate attachment means. To achieve this the winged idlers can be mounted by means of an open parallelogram shaped structure attached to the weigh frame or to a fixed structure at each end of the weigh frame, or both. If the winged or troughed idlers are simply attached to the transition structures then the force required to turn the idlers (or to slide over the idlers if they are jammed) will interact with the transition structure pivots to introduce errors into the output weight signal from the weigh frame.

It should be noted, however, that it is possible that the introduction of winged or troughed idlers, if implemented symmetrically on the entry and exit transition structures, may cancel so that an overall introduced force is negligible. If desired, winged or troughed idlers on the entry and exit transition structures can be applied using an open parallelogram geometry suspension which does not introduce idler frictional forces into the output weight signal.

In a further embodiment, using a fully suspended weigh frame, the weigh frame may consist of a frame resting on 2, 3, 4, 5, 6, etc., or more load cells or other weight measurement devices. Alternatively, a series of levers and/or mechanical links can be provided which direct mechanical forces and distribute them to 1, 2, 3, 4, etc., or more load cells or other weight measurement devices.

In a particular example, the weigh frame can include lateral and longitudinal restraints to ensure that the output weight signal is not influenced by forces perpendicular to the moving belt and any material conveyed on the belt. The weigh frame may include an open parallelogram shaped frame and/or flexures to achieve this result.

In another aspect, material movement on a belt could be reduced by provision of a thicker belt. Thickness of belts varies between particular conveyor belt installations. Often, a 20 mm thickness is used for a 1.0 m wide belt, or a 35 mm thickness is used for a 2.0 m wide belt. By providing belts of relatively greater thickness than compared to accepted industry standards, less disturbance forces are transmitted to conveyed material at the idlers/rollers, which results in less material bounce and thus less relative material movement on the belt or other non-linear dynamic effect.

Additionally or alternatively, the belt surface material and/or composition can be selected to assist in reducing material movement relative to the belt. By providing a belt surface or composition with a relatively greater than typical coefficient of friction the belt surface may better hold the conveyed material in position, thereby reducing material slip on the belt. Protruding structures from the surface of the belt, or indents into the surface of the belt, could be provided to reduce relative movement of the material to the belt surface.

FURTHER EXAMPLE

The following example provides a more detailed discussion of a particular embodiment. The example is intended to be merely illustrative and not limiting to the scope of the present invention.

Figure 4:
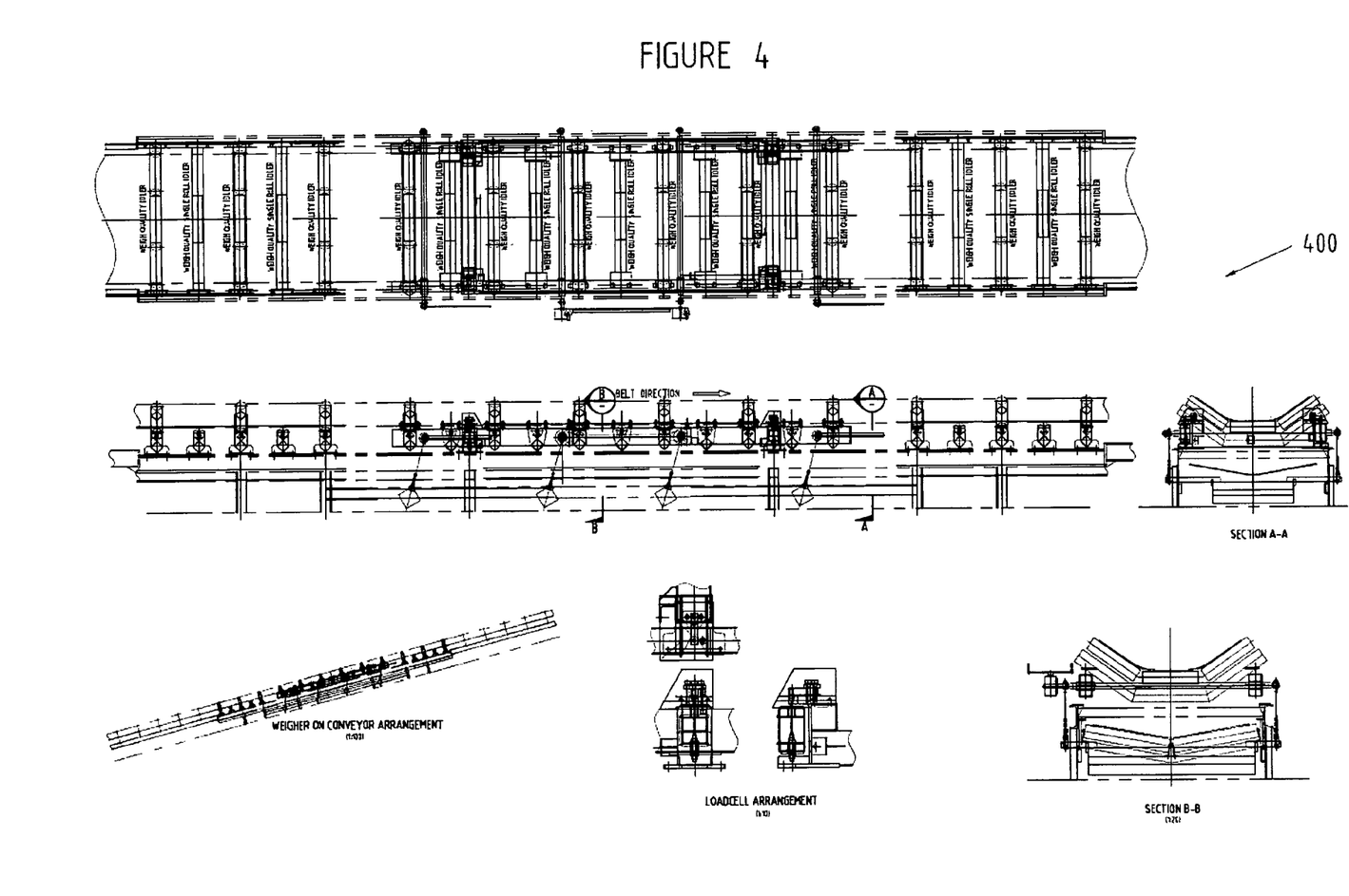
FIG. 4 illustrates top, side and cross-sectional views of a detailed specific example of a belt weighing system.
Figure 5:
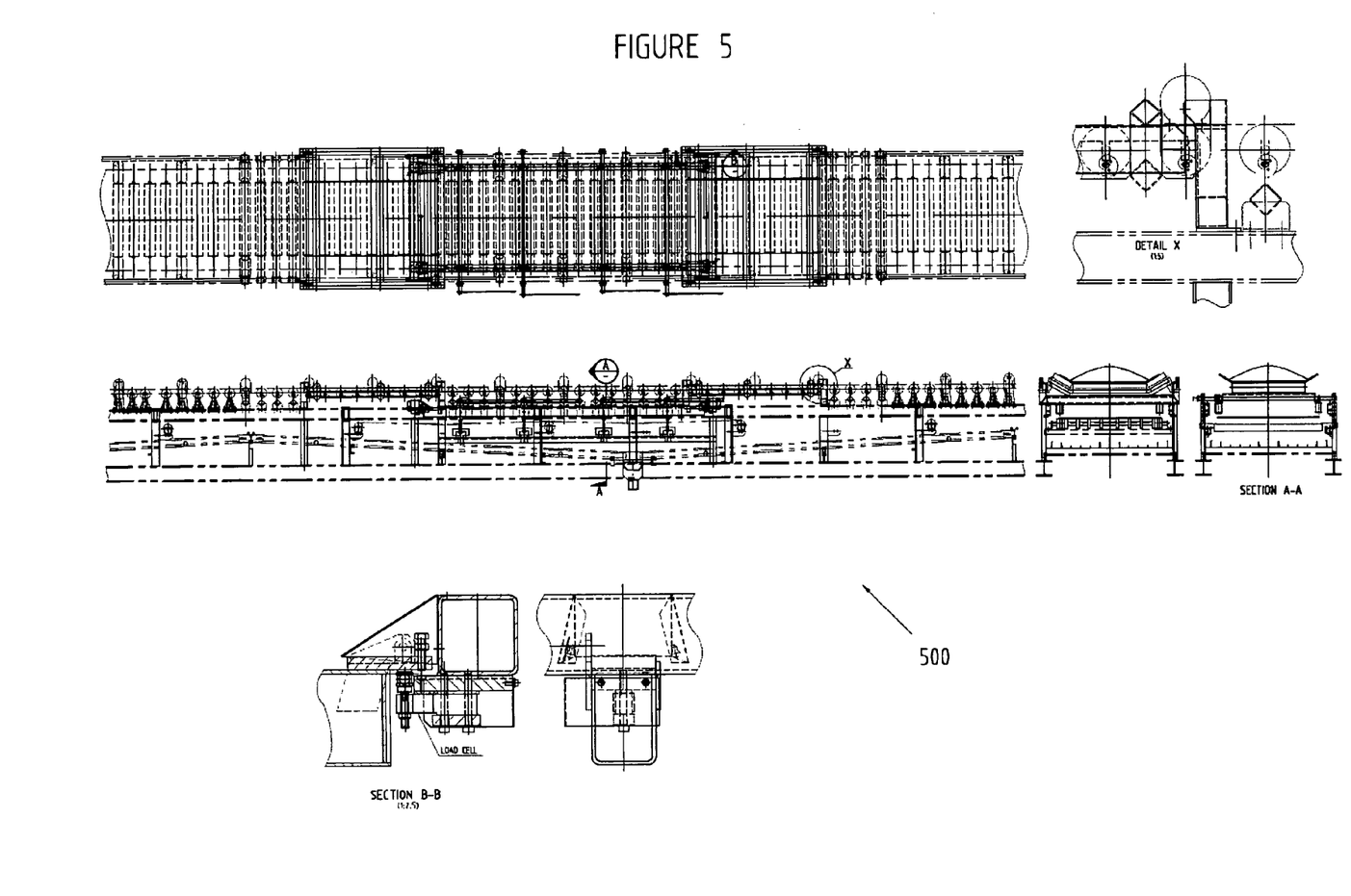
FIG. 5 illustrates top, side and cross-sectional views of another specific example belt weighing system.
Figure 6:
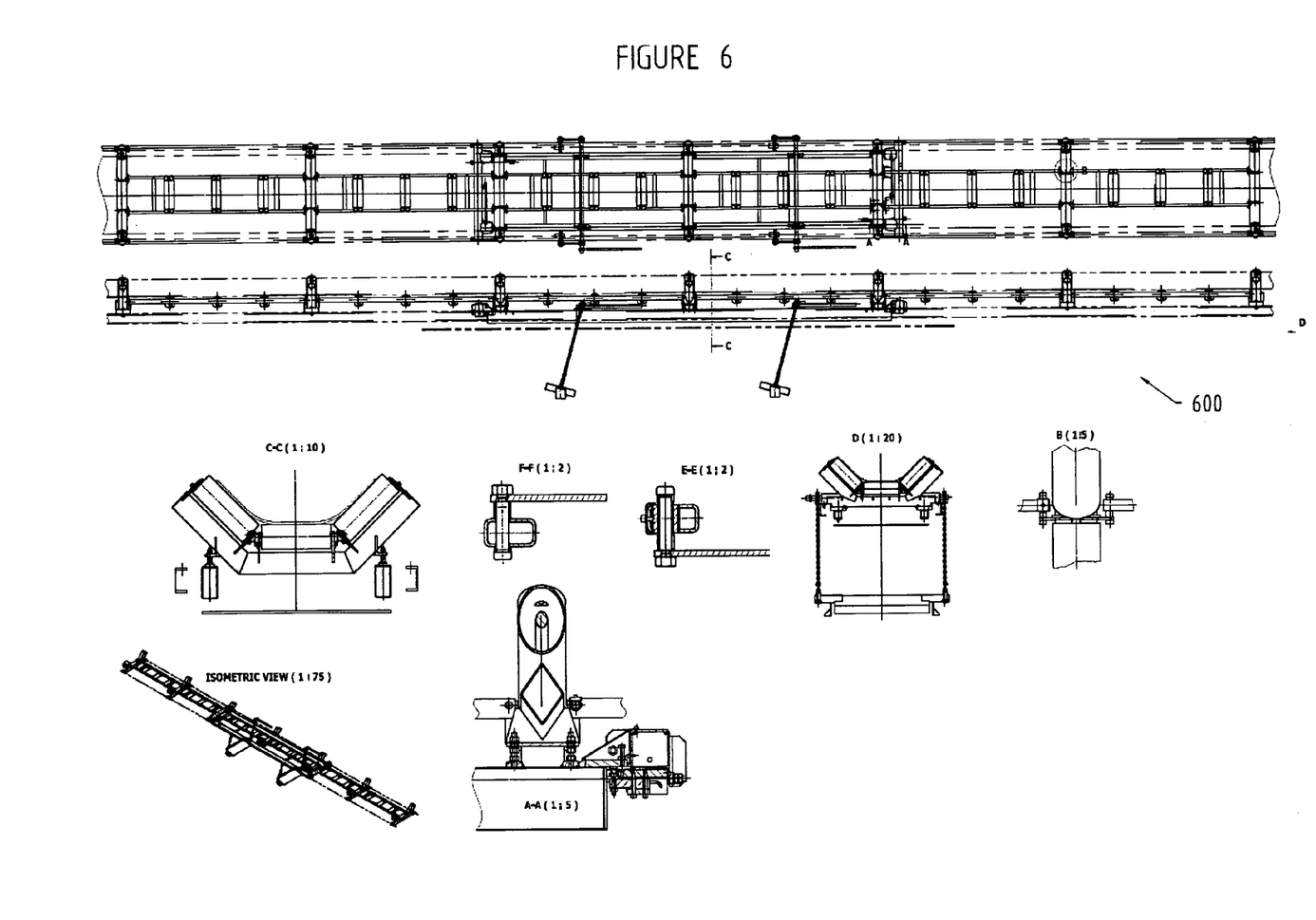
FIG. 6 illustrates top, side and cross-sectional views of another specific example belt weighing system.
Figure 7:
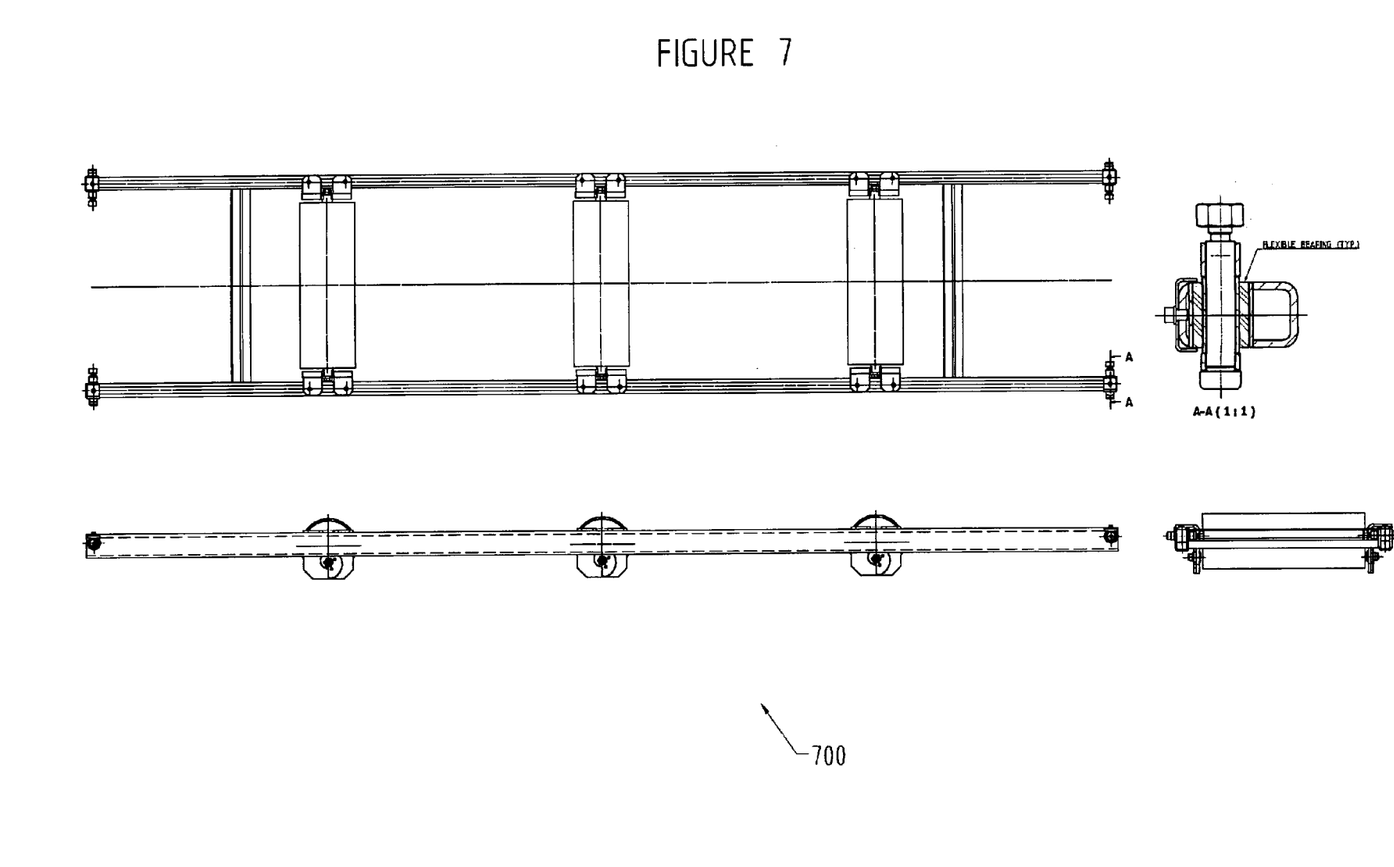
FIG. 7 illustrates top, side and cross-sectional views of another specific example belt weighing system.

Referring to FIG. 4, there is illustrated top, side and cross-sectional views of a specific and non-limiting example of structural components of a belt weighing system 400. Referring to FIG. 5, there is illustrated top, side and cross-sectional views of a further specific, but non-limiting, example of structural components of a belt weighing system 500. Referring to FIG. 6, there is illustrated top, side and cross-sectional views of a further specific, but non-limiting, example of structural components of a belt weighing system 600. Referring to FIG. 7, there is illustrated top, side and cross-sectional views of a further specific, but non-limiting, example of structural components of a belt weighing system 700.

Figure 8:
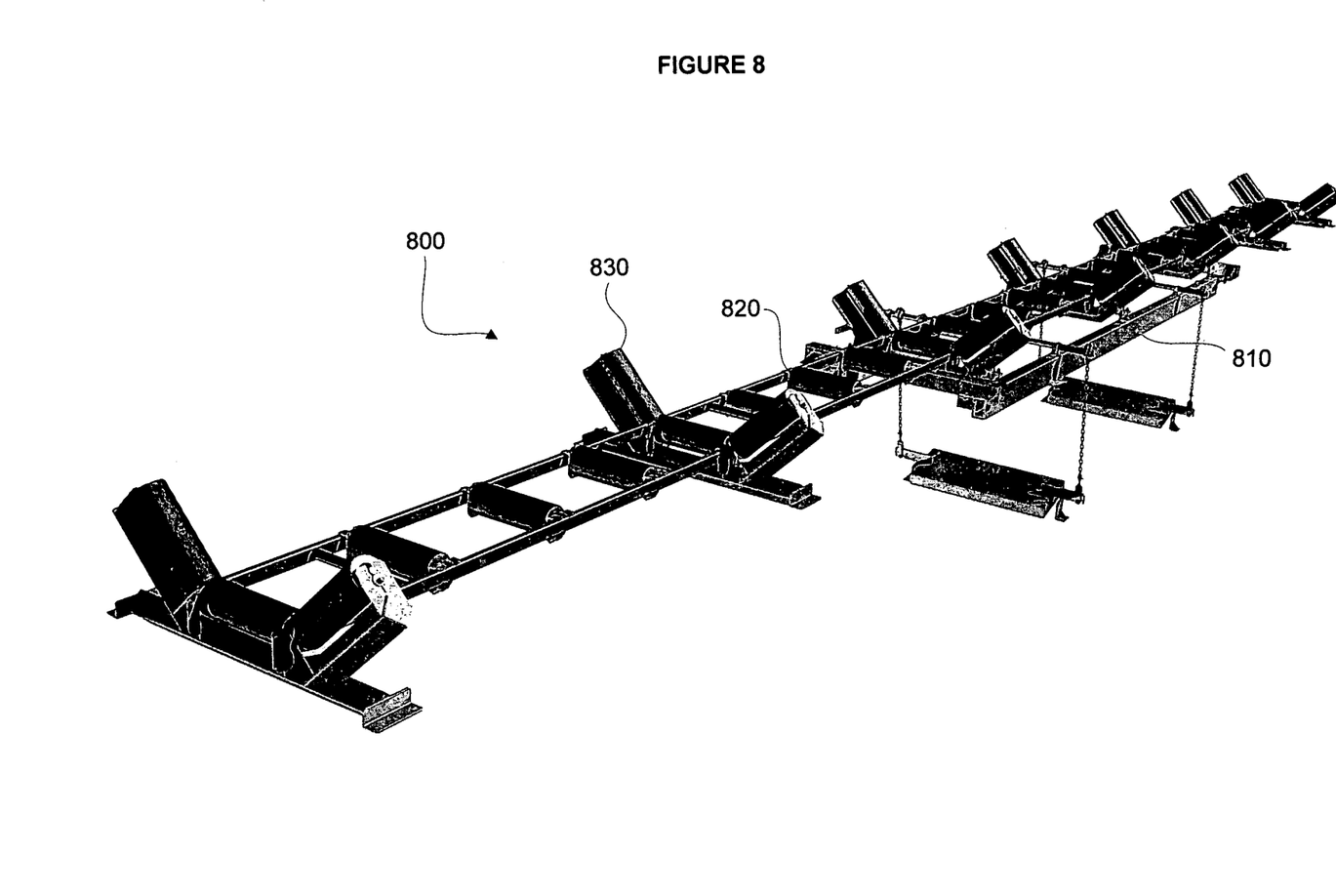
FIG. 8 illustrates an isometric view of an example belt weighing system (with the belt not illustrated).

Referring to FIG. 8, there is illustrated an isometric view of an example belt weighing system 800 (with the belt not illustrated). Belt weighing system 800 includes a fully suspended weigh frame 810 including a plurality of closely spaced belt support components 820. Closely spaced belt support components 820 are used throughout the conveyor section illustrated and support a belt in relation to the fully suspended weigh frame 810. Winged support components 830 are also provided.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A belt weighing system, comprising:
   a weigh frame;
   additional belt support components positioned on the weigh frame and adjacent the weigh frame along a conveyor belt, and between spaced apart idlers that support the conveyor belt; and
   an entry transition support structure positioned on a first side of the weigh frame and including one or more of the additional belt support components,
   wherein the additional belt support components positioned on the entry transition support structure include horizontal carry idlers and are positioned to reduce belt sag to reduce relative movement of conveyed material along the conveyor belt, and
   wherein the entry transition support structure is pivoted at or near a line of contact of the conveyor belt with a last fixed idler before the weigh frame, and on the end toward the weigh frame is pivoted at or near a line of contact between the conveyor belt and a first idler on the weigh frame.

2. The system as claimed in claim 1, wherein the additional belt support components support a horizontal base of the conveyor belt.

3. The system as claimed in claim 1, wherein the additional belt support components positioned on the weigh frame are one or more of: idlers, a slider bed, a fixed base slider bed or an air supported bed.

4. The system as claimed in claim 1, wherein the additional belt support components reduce sag of the conveyor belt on and adjacent the weigh frame to less than 1 to 2% of the spacing between the spaced apart idlers.

5. The system as claimed in claim 4, wherein extended spacing apart of about 2 to about 3 times of spaced apart idlers is used.

6. The system as claimed in claim 1, wherein the additional belt support components are additional horizontal idlers.

7. The system as claimed in claim 6, wherein spacing between the spaced apart idlers is more than 1.0 m, and wherein spacing between spaced apart idlers and adjacent additional horizontal idlers is less than 1.0 m.

8. The system as claimed in claim 1, wherein the conveyor belt includes a surface structure or composition to further reduce material slip on the conveyor belt.

9. The system as claimed in claim 8, wherein the surface structure includes protruding structures or indents.

10. The system as claimed in claim 1, including angled idlers in addition to the additional belt support components.

11. The system as claimed in claim 1, including one or more winged support components being part of a parallelogram structure.

12. The system as claimed in claim 1, wherein the additional belt support components positioned on the weigh frame include a pivoted slider bed.

13. The system as claimed in claim 1, wherein the additional belt support components positioned on the entry transition support structure include a closely spaced idler rack that is positioned between spaced apart idlers.

14. The system as claimed in claim 13, wherein the closely spaced idler rack is pivoted at each end.

15. The system as claimed in claim 14, wherein the closely spaced idler rack includes horizontal carry idlers and is pivoted at each end at or near a line of contact of the conveyor belt with the top of the idlers.

16. The system as claimed in claim 1, including an exit transition support structure positioned on a second side of the weigh frame and including one or more of the additional belt support components,
   wherein the exit transition support structure is pivoted at or near a line of contact of the conveyor belt with a first fixed idler after the weigh frame, and on the end toward the weigh frame is pivoted at or near a line of contact between the conveyor belt and a last idler on the weigh frame.

* * * * *